United States Patent
Chung

(10) Patent No.: US 12,029,196 B1
(45) Date of Patent: Jul. 9, 2024

(54) PET COUCH

(71) Applicant: Plusmofa International Ltd., Miaoli County (TW)

(72) Inventor: Yu-Wei Chung, Miaoli County (TW)

(73) Assignee: PLUSMOFA INTERNATIONAL LTD., Miaoli County (TW)

( * ) Notice: Subject to any disclaimer, the term of this patent is extended or adjusted under 35 U.S.C. 154(b) by 38 days.

(21) Appl. No.: 18/112,526

(22) Filed: Feb. 22, 2023

(51) Int. Cl.
*A01K 1/03* (2006.01)
*A01K 1/035* (2006.01)

(52) U.S. Cl.
CPC .................................. *A01K 1/0353* (2013.01)

(58) Field of Classification Search
CPC .............................. A01K 1/0353; A01K 1/035
USPC ........................................................ 119/28.5
See application file for complete search history.

(56) References Cited

U.S. PATENT DOCUMENTS

| | | | | |
|---|---|---|---|---|
| 4,860,689 | A * | 8/1989 | Stewart | A01K 1/0353 |
| | | | | 119/28.5 |
| 5,161,484 | A * | 11/1992 | Duane | A01K 1/035 |
| | | | | 5/426 |
| 6,622,652 | B1 * | 9/2003 | Wang | A01K 1/0353 |
| | | | | 119/28.5 |
| 10,905,093 | B2 * | 2/2021 | Repins | A01K 1/0353 |
| 11,419,307 | B2 * | 8/2022 | Tuthill | A01K 1/0353 |
| 2002/0185072 | A1 * | 12/2002 | Walpin | A01K 1/0353 |
| | | | | 119/28.5 |
| 2004/0134433 | A1 * | 7/2004 | Holder | A01K 1/0353 |
| | | | | 119/28.5 |
| 2004/0194713 | A1 * | 10/2004 | Dalal | A01K 1/0353 |
| | | | | 119/28.5 |
| 2006/0272581 | A1 * | 12/2006 | Dunn | A01K 1/0353 |
| | | | | 119/28.5 |
| 2008/0173627 | A1 * | 7/2008 | Martin | A01K 1/0353 |
| | | | | 119/28.5 |
| 2008/0282987 | A1 * | 11/2008 | Ritchey | A01K 1/0353 |
| | | | | 119/28.5 |
| 2010/0229798 | A1 * | 9/2010 | Litchmore | A01K 5/0114 |
| | | | | 119/51.01 |
| 2012/0318206 | A1 * | 12/2012 | van Leeuwen | A01K 5/0114 |
| | | | | 248/163.1 |
| 2016/0057970 | A1 * | 3/2016 | Lowery | A01K 1/0353 |
| | | | | 119/28.5 |
| 2016/0113239 | A1 * | 4/2016 | Hagemeier | A01K 1/0353 |
| | | | | 119/28.5 |
| 2016/0198674 | A1 * | 7/2016 | Younger | A01K 1/0353 |
| | | | | 119/28.5 |

(Continued)

*Primary Examiner* — Yvonne R Abbott-Lewis
(74) *Attorney, Agent, or Firm* — WPAT, P.C

(57) ABSTRACT

A pet couch includes a base, a main cushion part, and a side cushion part. The base has a plurality of engagement grooves concavely disposed on a top face, and is able to be combined with a base of a human couch. The base of the pet couch and the base of the human couch are modularized. The main cushion part has a cushion body and an anti-scratch cover. The cushion body has a bottom plate having a plurality of engagement bars protruding thereon to be engaged with the engagement grooves. The anti-scratch cover is mounted around one side of the cushion body in opposite to the base and has a first combination member disposed on one side in opposite to the base. The side cushion part has a second combination member, which is detachably combined with the first combination member, whereby the side cushion part is combined with the anti-scratch cover.

9 Claims, 6 Drawing Sheets

(56) References Cited

U.S. PATENT DOCUMENTS

| | | | |
|---|---|---|---|
| 2023/0200349 A1* | 6/2023 | Tuthill | A01K 1/0353 119/28.5 |
| 2023/0276767 A1* | 9/2023 | Bohm | A01K 1/0353 119/28.5 |

* cited by examiner

PET COUCH

BACKGROUND OF THE INVENTION

1. Field of the Invention

The present invention relates to couches, and more particularly, to a pet couch.

2. Description of the Related Art

With the progress of time and the change of lifestyle, many people now have pets and regard pets as family members. Therefore, modern people often provide facilities for pets at home, such as cat trees and pet couches, so as to provide their pets with a good and cozy living environment.

Pet couches currently on the market are usually independently manufactured, so the overall structure of parts of a pet couch is different from that of a human couch. Therefore, the pet couch is unable to be combined with the human couch, so that the pet couch is usually positioned at a location having a certain distance away from the location of the human couch. As a result, when the pet owners sit on their couch, they are unable to have an intimate interaction with their pet sitting on the pet couch.

Moreover, since the parts used in the pet couch and the human couch are structurally different, if the pet couch is damaged, it is necessary to purchase additional parts for maintenance, causing a difficulty and higher cost of maintenance of the pet couches on the market.

SUMMARY OF THE INVENTION

To improve the issues above, the present invention discloses a pet couch, which applies a base that is modularized based on a human couch, such that the user is allowed to combine the present invention with the human couch according to actual demands, whereby the user and the pet are able to sit together for having interactions, improving the affection and relationship between the user and the pet.

For achieving the aforementioned objectives, the present invention provides a pet couch, comprising a base, a main cushion part, and a side cushion part. The top face of the base comprises a plurality of engagement grooves concavely disposed, so as to be combined with a base of a human couch, wherein the base of the pet couch and the base of the human couch are modularized. The main cushion part comprises a cushion body and an anti-scratch cover. The cushion body comprises a bottom plate, which comprises a plurality of engagement bars protruding thereon and engaged with the engagement grooves. The anti-scratch cover is mounted around one side of the cushion body in opposite to the base and comprises a first combination member disposed on one side of the anti-scratch cover in opposite to the base. The side cushion part comprises a second combination member, which is detachably combined with the first combination part, whereby the side cushion part and the anti-scratch cover are combined and fixed.

With such configuration, the base of the present invention and the base of the human couch are modularized. Therefore, the user is allowed to optionally combine the pet couch with the human couch, so that the user and the pet are able to sit together to improve the affection and relationship therebetween.

Also, due to the modularized design of the bases, the parts for the present invention and the human couch are commonly applicable. Thus, when the part of the base of the present invention is damaged, the user is allowed to directly replace it with the part of the human couch base, without the necessity of preparing additional spare parts, improving the convenience of maintenance, and reducing the manufacturing cost of additional parts.

DETAILED DESCRIPTION OF THE INVENTION

Figure 1:
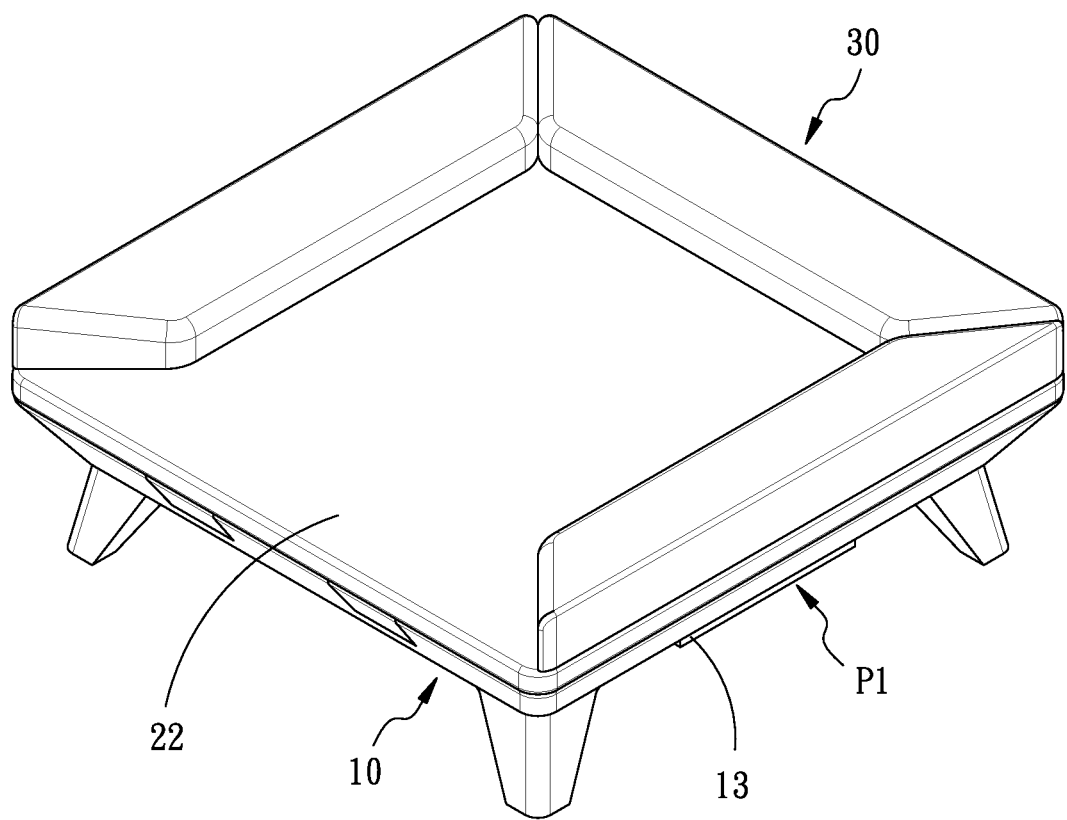
FIG. 1 is a perspective view of the pet couch in accordance with an embodiment of the present invention.
Figure 2:
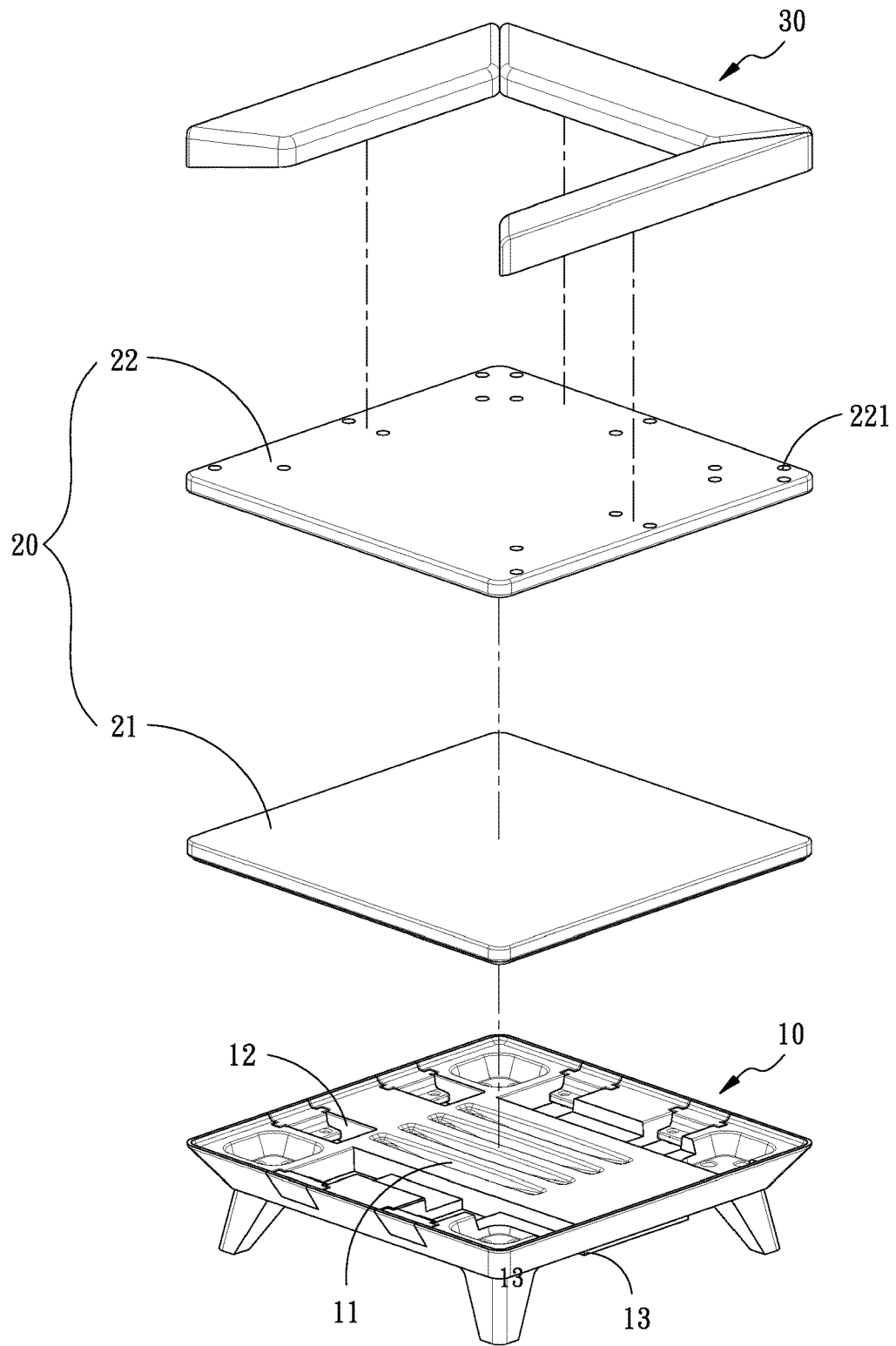
FIG. 2 is an exploded view of the pet couch in accordance with an embodiment of the present invention.
Figure 3:
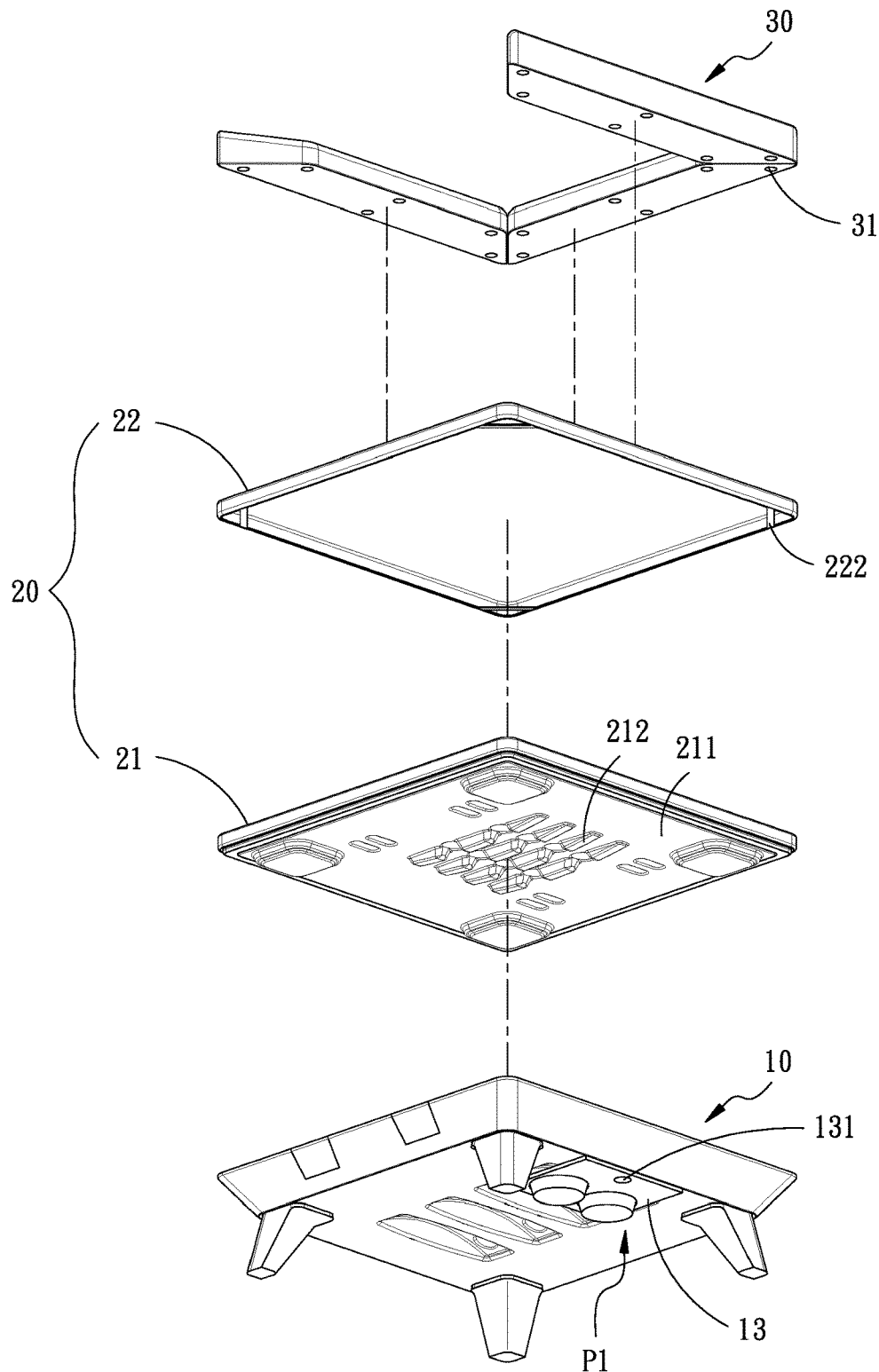
FIG. 3 is another exploded view of the pet couch taken from another point of view.
Figure 4:
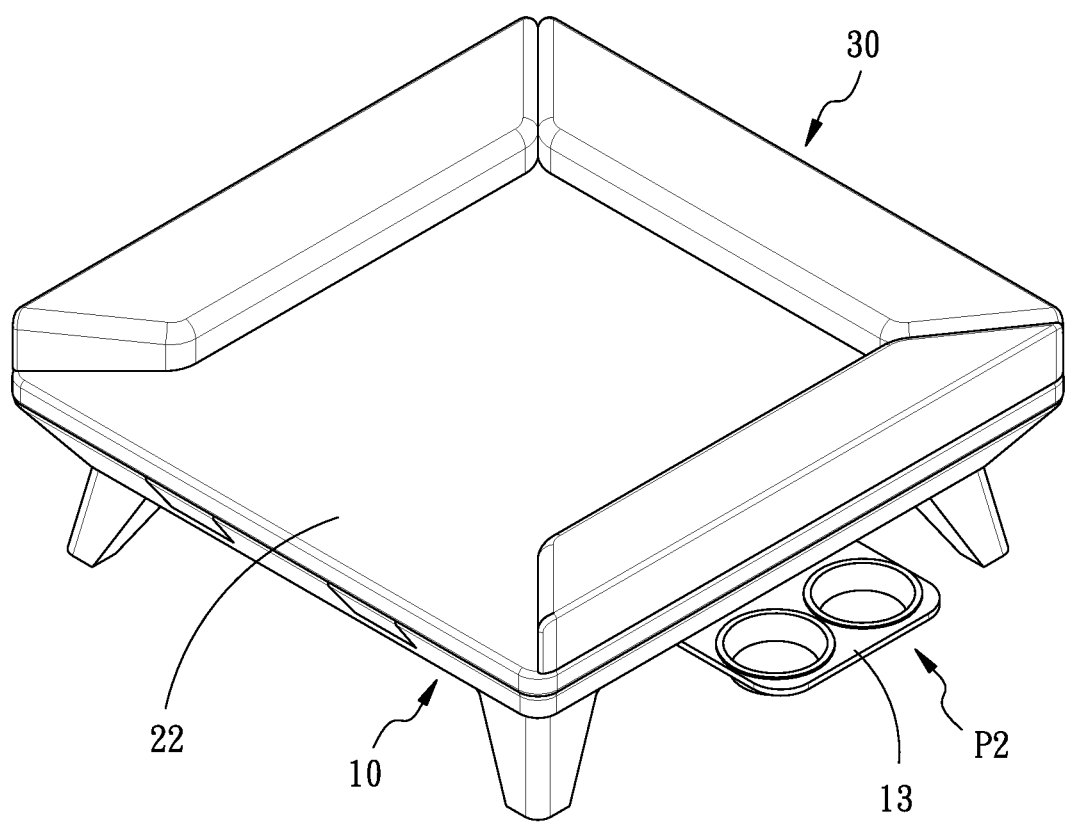
FIG. 4 is a perspective view of the pet couch, illustrating the feed plate at the usage position.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 6, the present invention provides a pet couch 100, comprising a base 10, a main cushion part 20, and a side cushion part 30. Therein, the base 10 of the pet couch 100 and a base 210 of a human couch 200 are modularized. Therefore, the user is allowed to optionally combine the pet couch 100 with the human couch 200, so as to sit with the pet and improve the affection and relationship between them.

Figure 5:
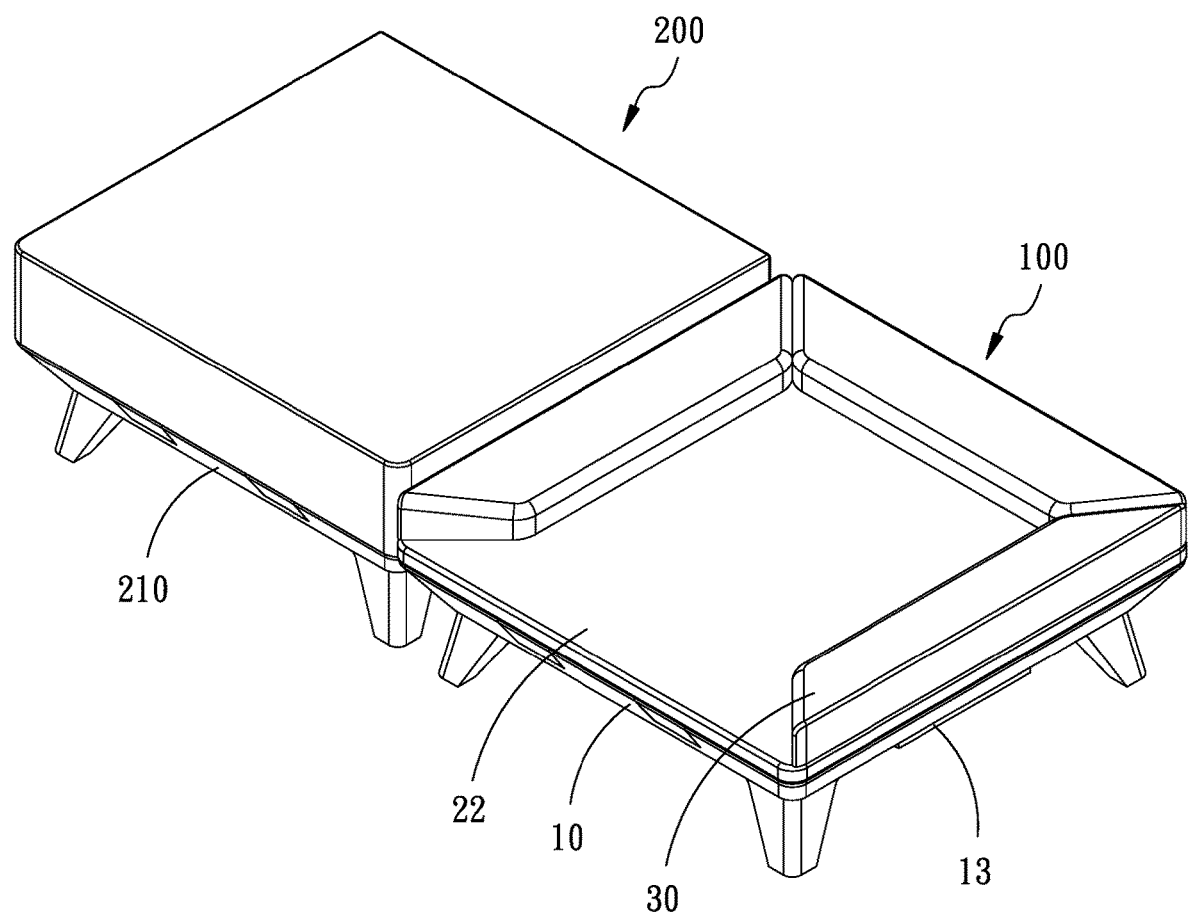
FIG. 5 is a schematic view of the usage status of the pet couch in accordance with an embodiment of the present invention, illustrating the present invention being combined with a human couch.
Figure 6:
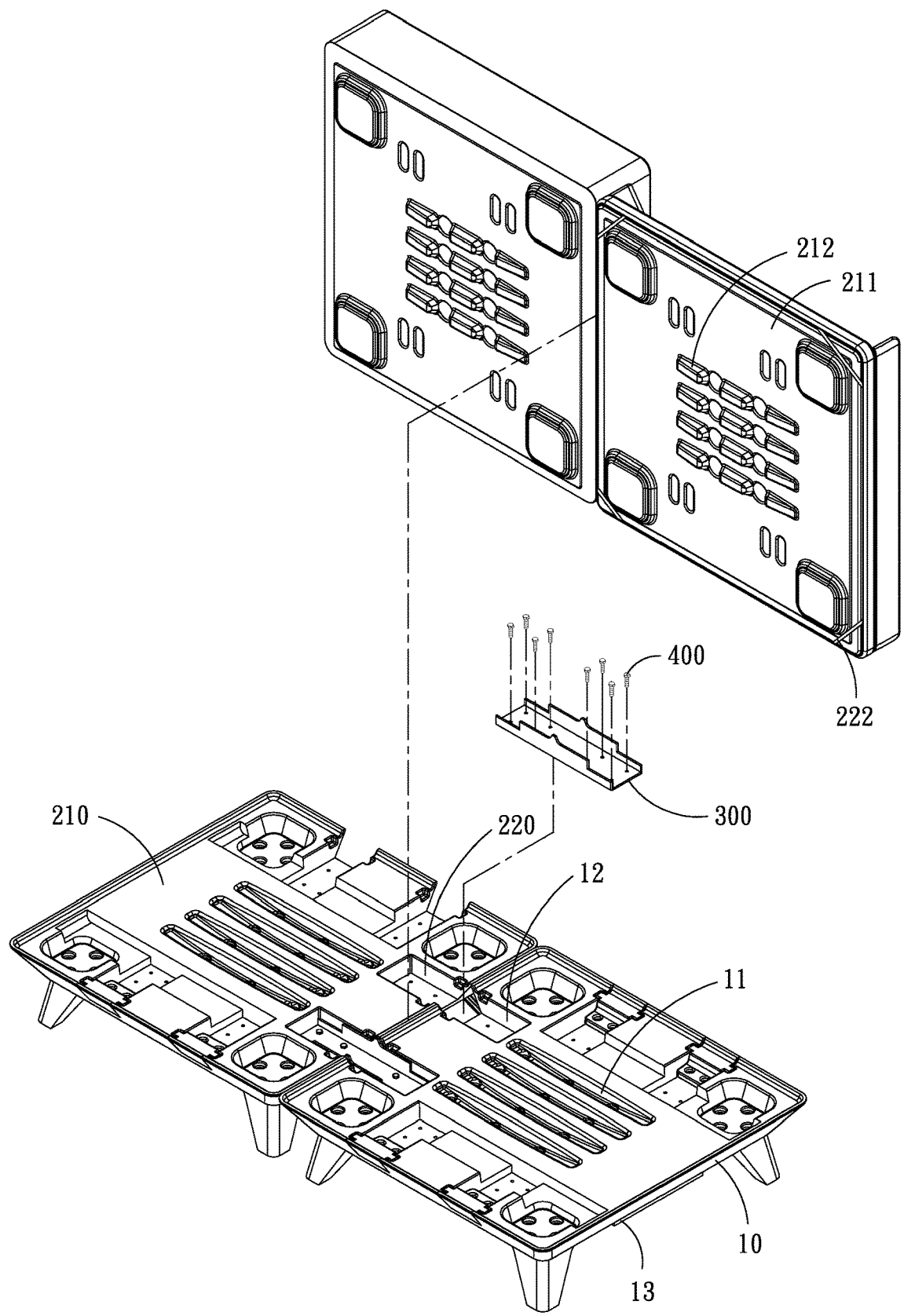
FIG. 6 is a schematic exploded view of the usage status of the pet couch, illustrating the combination relationship of the present invention and the human couch.

The base 10 comprises a plurality of engagement grooves 11 concavely disposed on the top face thereof, allowing the main cushion part 20 to be combined and fixed thereon. As shown by FIG. 5 and FIG. 6, in the embodiment, the base 10 and the base 210 are modularized, such that the user is able to combine the base 10 and the base 210 according to actual usage demand, so as to sit together with the pet and improve the affection and relationship between them. Also, due to the modularized design of the base 10 and the base 210, the parts of the base 10 and the base 210 are commonly applicable. Therefore, when the part of the base 10 is damaged, the user is allowed to directly replace it with the part of the base 210, without the necessity of preparing additional spare parts, improving the convenience of maintenance, and reducing the manufacturing cost of additional parts.

Referring to FIG. 5 and FIG. 6, the combination structure of the base 10 of the present invention and the base 210 of the human couch 200 is illustrated. The base 10 comprises a first connection recess 12 on a lateral side of the top face thereof, and the base 210 comprises a corresponding second connection recess 220 on a lateral side of the top face thereof, such that the first connection recess 12 and the second connection recess 220 receive a connection member 300, and the connection member 300 is fastened in the first connection recess 12 and the second connection recess 220 through a plurality of bolts 400. Therefore, the base 10 of the present invention and the base 210 of the human couch 200 are combined by use of the connection member 300, allowing the user to sit with the pet and improve the affection and relationship between them Referring to FIG. 1 to FIG. 4, in the embodiment, the base 10 further comprises a feed plate 13. The feed plate 13 is pivotally disposed on one side of the base 10 away from the main cushion part 20 through a pivot axle 131. Therein, as shown by FIG. 1 to FIG. 4, the feed plate 13 is pivotable between an idle position P1 and a usage position P2 about the pivot axle 131. When the feed plate is at the idle position P1, the feed plate 13 is positioned on one side of the base 10 away from the main cushion part 20, such that the feed plate 13 is stored in the space beneath the base 10, achieving an effective use of storage space. When the feed plate 13 is at the usage position P2, the feed plate 13 protrudes outward from the edge of the side of the base 10 away from the main cushion part 20, such that the user is allowed to place the pet feed and water in the feed plate 13 for the pet to consume.

The main cushion part 20 comprises a cushion body 21 and an anti-scratch cover 22. The cushion body 21 comprises a bottom plate 211 having a plurality of engagement bars 212 protruding thereon, such that the engagement bars 212 and the engagement grooves 11 are engaged for positioned the cushion body 21 on the base 10. The anti-scratch cover 22 is mounted around one side of the cushion body 21 in opposite to the base 10. The anti-scratch cover 22 comprises a first combination member 221 disposed on one side thereof in opposite to the base 10, so that the first combination member 221 is applied for detachably combining the main cushion part 20 and the side cushion part 30. Therein, the anti-scratch cover 22 is formed of a material having an anti-scratch function, such as linen cloth, velvet cloth, nylon cloth, or synthetic latex leather.

As shown by FIG. 1 to FIG. 4, in the embodiment, the anti-scratch cover 22 further comprises a combining band 222 disposed on one side of the anti-scratch cover 22 facing the base 10. The combining band 222 is mounted around the periphery of the bottom plate 211 of the cushion body 21, so that the anti-scratch cover 22 is mounted on the cushion body 21, whereby the anti-scratch cover 22 protects the cushion body 21 from being directly damaged by the pet. Therein, as shown by FIG. 1 to FIG. 4, in the embodiment, a plurality of combining bands 222 is provided and disposed on the four corners of the anti-scratch cover 22, respectively, so as to be mounted on the four corners of the bottom plate 211, allowing the anti-scratch cover 22 to be stably mounted on the cushion body 21 for preventing the cushion body 21 from damage caused by the pet.

The side cushion part 30 comprises a second combination member 31, which is detachably combined with the first combination member 221, whereby the side cushion part 30 and the anti-scratch cover 22 is combined. As shown by FIG. 1 to FIG. 4, in the embodiment, a plurality of side cushion parts 30 is provided and disposed on the periphery of one side of the anti-scratch cover 22 in opposite to the base 10, allowing the pet to comfortably sit on the main cushion part 20. Therein, the number and size of the side cushion part 30 is adjustable according to the need of the pet. For example, if the pet is a large sized dog (such as husky, golden retriever, etc.), the user is able to use only one side cushion part 30, so that the pet is prevented from feeling crowded when sitting on the main cushion part 20. If the pet is a small sized dog (such as chihuahua, Pomeranian, etc.), the height of the side cushion part 30 is able to be reduced, so that the pet is prevented from having a sense of oppression when sitting on the main cushion part 20.

Referring to FIG. 1 to FIG. 4, in the embodiment, the first combination member 221 and the second combination member 31 are magnetic members, so as to be combined in a manner of magnetic attraction, allowing the side cushion part 30 to be positioned and fixed on the main cushion part 20, and facilitating the disassembly and replacement process by the user. In other embodiments, the first combination member 221 and the second combination member 31 are allowed to be adherence attachment members (such as Velcro), so as to be combined in an adherence manner. Alternatively, the first combination member 221 and the second combination member 31 are allowed to be a zipper structure, so as to be combined in a zipping manner. Therefore, the first combination member 221 and the second combination member 31 are allowed to be replaced according to the preference and demand of the user, facilitating the convenience of usage.

With the foregoing configuration, the base 10 of the pet couch 100 of the present invention and the base 210 of the human couch 210 are modularized. Therefore, the user is able to optionally combine the pet couch 100 and the human couch 200, so as to sit together with the pet and improve the affection and relationship between them.

Also, due to the modularized design of the base 10 and the base 210, the parts of the base 10 and the base 210 are commonly applicable. Therefore, when the part of the base 10 is damaged, the user is allowed to directly replace it with the part of the base 210, without the necessity of preparing additional spare parts, improving the convenience of maintenance, and reducing the manufacturing cost of additional parts.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pet couch, comprising:
   a base comprising a plurality of engagement grooves concavely disposed on a top face thereof, the base being able to be combined with a base of a human couch, the base of the pet couch and the base of the human couch being modularized;
   a main cushion part comprising a cushion body and an anti-scratch cover, the cushion body comprising a bottom plate having a plurality of engagement bars protruding thereon, the engagement bars being engaged with the engagement grooves, the anti-scratch cover being mounted around one side of the cushion body in opposite to the base, the anti-scratch cover comprising a first combination member disposed on one side of the anti-scratch cover in opposite to the base; and
   a side cushion part comprising a second combination member, the second combination member being detachably combined with the first combination member, whereby the side cushion part is combined with the anti-scratch cover.

2. The pet couch of claim 1, wherein the anti-scratch cover further comprises a combining band; the combining band is disposed on one side of the anti-scratch cover facing the base, and the combining band is mounted around a periphery of the bottom plate of the cushion body.

3. The pet couch of claim 2, wherein a plurality of combining bands is provided and disposed on four corners of the anti-scratch cover.

4. The pet couch of claim 1, wherein a plurality of side cushion parts is provided; the side cushion parts are disposed on a periphery of one side of the anti-scratch cover in opposite to the base.

5. The pet couch of claim 1, wherein the first combination member and the second combination member are magnetic members, so as to be combined in a manner of magnetic attraction.

6. The pet couch of claim 1, wherein the first combination member and the second combination member are adherence attachment members, so as to be combined in an adherence manner.

7. The pet couch of claim 1, wherein the first combination member and the second combination member are a zipper structure, so as to be combined in a zipping manner.

8. The pet couch of claim 1, wherein the base further comprises a feed plate; the feed plate is pivotally disposed on one side of the base away from the main cushion part.

9. The pet couch of claim 8, wherein the feed plate is pivotable between an idle position and a usage position; when the feed plate is at the idle position, the feed plate is positioned on the side of the base away from the main cushion part; when the feed plate is at the usage position, the feed plate protrudes outward from an edge of the side of the base away from the main cushion part.

* * * * *